US009274390B2

(12) United States Patent
Chang et al.

(10) Patent No.: US 9,274,390 B2
(45) Date of Patent: Mar. 1, 2016

(54) LIQUID CRYSTAL DISPLAY DEVICE AND FABRICATING METHOD THEREOF

(75) Inventors: Youn-Gyoung Chang, Kyonggi-do (KR); Woong-Kwon Kim, Kyonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 1733 days.

(21) Appl. No.: 10/201,922

(22) Filed: Jul. 25, 2002

(65) Prior Publication Data

US 2003/0020852 A1    Jan. 30, 2003

(30) Foreign Application Priority Data

Jul. 25, 2001    (KR) ............... P2001-044757

(51) Int. Cl.
*G02F 1/1362* (2006.01)
(52) U.S. Cl.
CPC ........... *G02F 1/136209* (2013.01); *G02F 2001/136222* (2013.01); *G02F 2201/40* (2013.01)
(58) Field of Classification Search
CPC .................................. G02F 1/136209

USPC ..................................... 349/106, 44
See application file for complete search history.

(56) References Cited

U.S. PATENT DOCUMENTS

| 5,299,041 | A | * | 3/1994 | Morin et al. ............. 349/42 |
| 5,818,550 | A | * | 10/1998 | Kadota et al. ........... 349/43 |
| 5,926,702 | A | * | 7/1999 | Kwon et al. ............. 438/158 |
| 6,038,006 | A | * | 3/2000 | Sasaki et al. ............ 349/106 |
| 6,137,552 | A | * | 10/2000 | Yanai ...................... 349/44 |
| 6,380,559 | B1 | * | 4/2002 | Park et al. ............... 257/59 |

* cited by examiner

*Primary Examiner* — Timothy L Rude
(74) *Attorney, Agent, or Firm* — Dentons US LLP

(57) ABSTRACT

A liquid crystal display device includes first and second substrates facing into each other, a gate line and a data line on an inner surface of the first substrate, the gate line and the data line defining a pixel region, a thin film transistor connected to the gate line and the data line, a pixel electrode connected to the thin film transistor and disposed at the pixel region, a color filter layer disposed closer than the pixel electrode from the first substrate, the color filter layer corresponding to the pixel electrode, a black matrix over the thin film transistor, a common electrode on an inner surface of the second substrate, and a liquid crystal layer interposed between the pixel electrode and the common electrode.

10 Claims, 13 Drawing Sheets

LIQUID CRYSTAL DISPLAY DEVICE AND FABRICATING METHOD THEREOF

This application claims the benefit of the Korean Patent Application No. P2001-44757 filed on Jul. 25, 2001, which is hereby incorporated by reference.

BACKGROUND OF THE INVENTION

1. Field of the Invention

The present invention relates to a liquid crystal display, and more particularly, to a liquid crystal display device and a fabricating method thereof. Although the present invention is suitable for a wide scope of applications, it is particularly suitable for preventing a photocurrent generation and improving an aperture ratio of the liquid crystal display device.

2. Discussion of the Related Art

Flat panel display (FPD) devices having small size, lightweight, and low power consumption may have been a subject of recent research in the advent of the information age. Among many kinds of FPD devices, liquid crystal display (LCD) devices have been widely developed and used because of their excellent characteristics in resolution, color display, and display quality.

Generally, LCD devices include an upper substrate and a lower substrate facing into each other with liquid crystal molecules interposed therebetween. Each substrate has an electrode on the inner surface thereof. An electric field is generated by applying a voltage to the electrodes, thereby driving the liquid crystal molecules to display images in accordance with light transmittance.

The lower substrate is referred to as an array substrate including a thin film transistor (TFT) that is formed through repeated deposition of thin films, photolithography, and an etch process. The upper substrate is referred to as a color filter substrate including a color filter layer that is formed through a dyeing method, a printing method, a pigment dispersion method, or an electro-deposition method. Three colors of red (R), green (G), and blue (B) are alternately disposed in the color filter layer.

FIG. 1 is a cross-sectional view of a conventional LCD device.

In FIG. 1, a gate electrode 12 of a conductive material such as metal is formed on a first substrate 11. A gate insulating layer 13 of silicon nitride (SiNx) or silicon oxide ($SiO_2$) is formed on the gate electrode 12. An active layer 14 of amorphous silicon is formed on the gate insulating layer 13 over the gate electrode 12. An ohmic contact layer 15a and 15b of doped amorphous silicon is formed on the active layer 14. Source and drain electrodes 16a and 16b of a conductive material such as metal are formed on the ohmic contact layer 15a and 15b. The source and drain electrodes 16a and 16b form a TFT "T" with the gate electrode 12. The gate electrode 12 and the source electrode 16a are connected to a gate line and a data line (not shown), respectively. The gate line and the data line cross each other and define a pixel region. A passivation layer 17 of SiNx, $SiO_2$ or an organic insulating material is formed on the source and drain electrodes 16a and 16b. The passivation layer 17 includes a contact hole 17c exposing the drain electrode 16b. A pixel electrode 18 of a transparent conductive material is formed on the passivation layer 17 and connected to the drain electrode 16b through the contact hole 17c.

A second substrate 21 is disposed over and spaced apart from the first substrate 11. A black matrix 22 corresponding to the TFT "T" is formed beneath the second substrate 21. The black matrix 22 has an open portion (not shown) corresponding to the pixel electrode 18. The black matrix 22 prevents a light leakage at an LCD panel except for the pixel electrode 18 and a photocurrent generated by screening a channel of the TFT "T" from the ambient light. The black matrix 22 is formed in a color filter layer 23a and 23b. The color filter layer 23a and 23b having three colors of R, G, and B is alternately disposed. The color filter layer corresponds to the pixel region. A common electrode 24 of a transparent conductive material is formed beneath the color filter layer 23a and 23b. A liquid crystal layer 30 is interposed between the pixel electrode 18 and the common electrode 24.

In a fabricating process of the conventional LCD device, the array substrate and the color filter substrate are respectively formed and attached in such a way that the pixel electrode of the array substrate corresponds to the color filter layer of the color filter substrate. When attaching the array substrate and the color filter substrate, deterioration such as light leakage may occur due to misalignment. To prevent this deterioration, the black matrix of the color filter substrate may be widened. However, as the black matrix becomes wider, an aperture ratio of the LCD device becomes lower.

Therefore, LCD devices having a new structure in which the color filter layer is disposed on the array substrate are suggested. In the LCD devices of the new structure, the width of the black matrix is reduced and the aperture ratio increases. The new structure may be classified into two types: TFT on color filter (TOC) type and color filter on TFT (COT) type. In the structure of the TOC type, a color filter layer is formed under a TFT. In the structure of COT type, a color filter layer is formed over a TFT. For both types, only a black matrix and a common electrode are formed on the color filter substrate.

However, since the black matrix is spaced apart from the TFT, the black matrix does not shield the oblique incident light or a portion of the light reflected at the black matrix. Therefore, such light reaches the channel of the TFT, thereby generating a photocurrent. Moreover, the TFT becomes non-uniform in characteristics.

SUMMARY OF THE INVENTION

Accordingly, the present invention is directed to a liquid crystal display device and a fabricating method thereof that substantially obviate one or more of problems due to limitations and disadvantages of the related art.

An object of the present invention is to provide a liquid crystal display device and a fabricating method thereof in which a photocurrent generation is effectively prevented and an aperture ratio is improved.

Another object of the present invention is to provide a liquid crystal display device and a fabricating method thereof in which an operating characteristic of a thin film transistor is improved.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates facing into each other, a gate line and a data line on an inner surface of the first substrate, the gate line and the data line defining a pixel region, a thin film transistor connected to the gate line and the data line, a pixel electrode connected to the thin film transistor and disposed at the pixel region, a color filter layer disposed closer than the pixel electrode from the first substrate, the color filter layer corresponding to the pixel electrode, a black matrix over the thin film transistor, a common electrode on an inner surface of the second substrate, and a liquid crystal layer interposed between the pixel electrode and the common electrode.

In another aspect of the present invention, a fabricating method of an array substrate for a liquid crystal display device includes forming a color filter layer on a substrate, forming a gate line and a data line on the color filter layer, forming a thin film transistor connected to the gate line and the data line, forming a passivation layer over the thin film transistor, the gate line, and the data line, forming a black matrix on the passivation layer over the thin film transistor, and forming a pixel electrode on the passivation layer, the pixel electrode being connected to the thin film transistor.

In another aspect of the present invention, a fabricating method of an array substrate for a liquid crystal display device includes forming a gate line and a data line on a substrate, the gate line and the data line crossing each other, forming a thin film transistor connected to the gate line and the data line, forming a color filter layer over the thin film transistor, the gate line, and the data line, forming a black matrix on the color filter layer over the thin film transistor, and forming a pixel electrode on the color filter layer, the pixel electrode being connected to the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
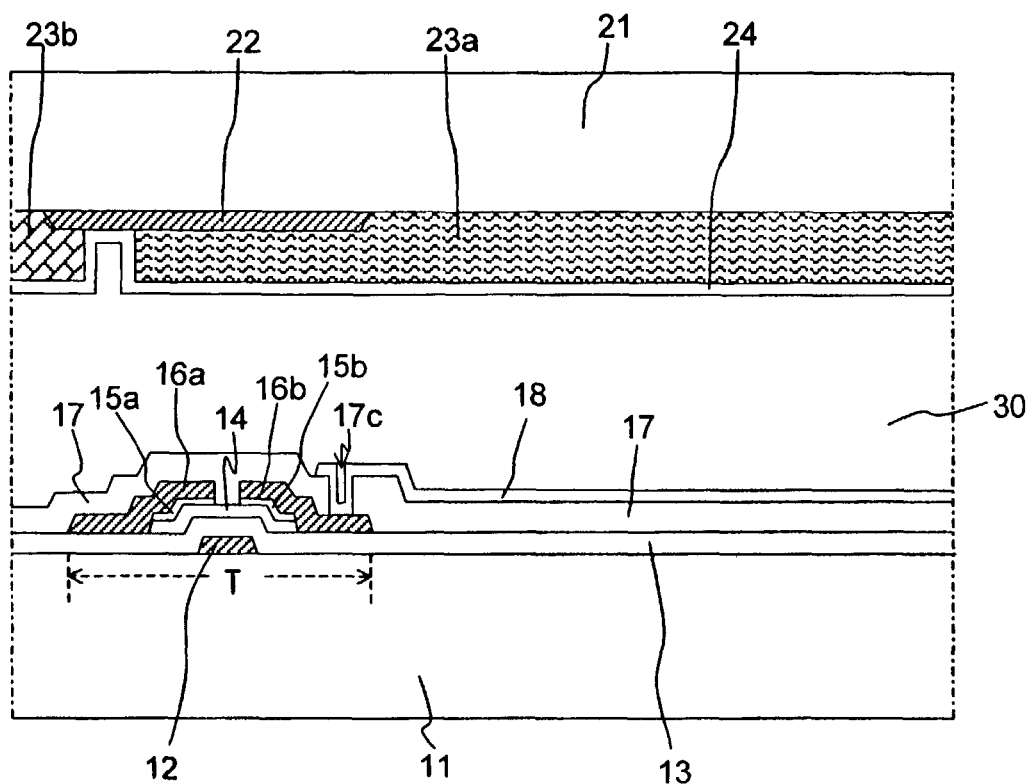
FIG. 1 is a cross-sectional view of a conventional LCD device.
Figure 2:
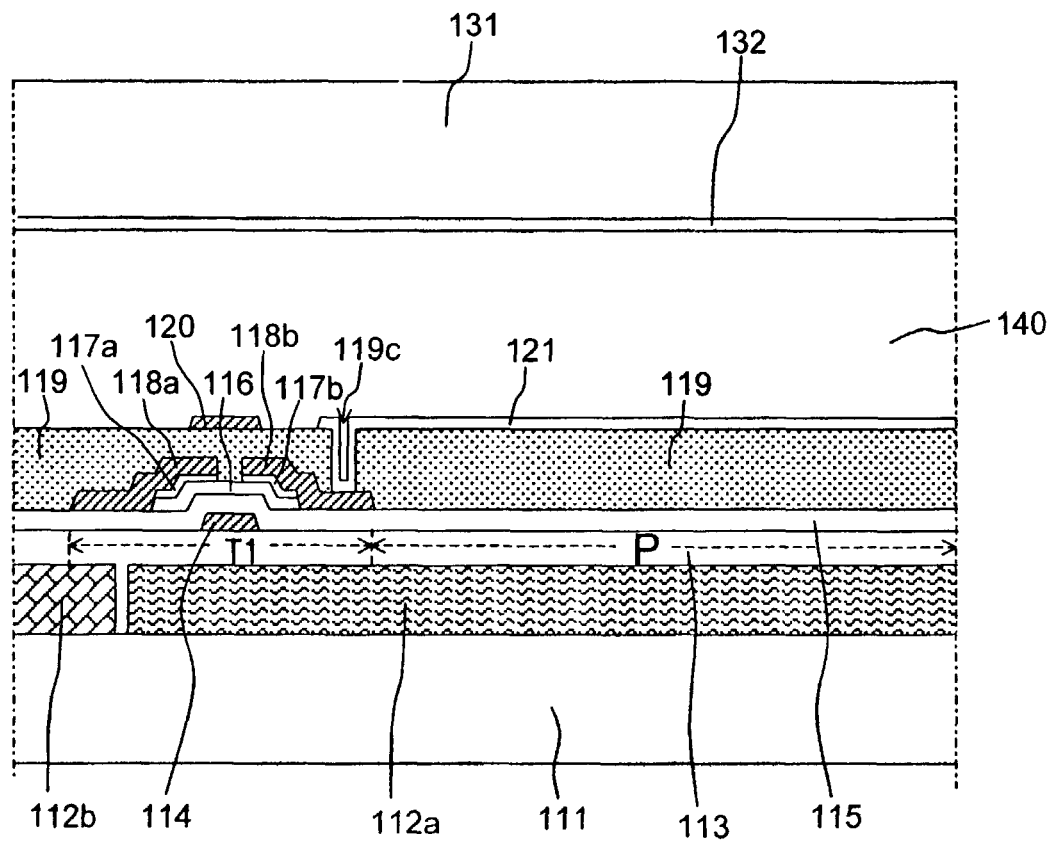
FIG. 2 is a schematic cross-sectional view of a liquid crystal display device according to a first embodiment of the present invention.

FIG. 2 is a schematic cross-sectional view of a liquid crystal display device according to a first embodiment of the present invention. The LCD device of FIG. 2 has a TOC type structure in which a color filter layer is formed under a TFT.

In FIG. 2, a first substrate 111 and a second substrate 131 are facing into and spaced apart from each other. A color filter layer 112a and 112b is formed on the inner surface of the first substrate 111. The color filter layer 112a and 112b having three colors of R, G, and B is alternately disposed. An overcoat layer 113 is formed on the color filter layer 112a and 112b. The overcoat layer 113 protects the color filter layer 112a and 112b and planarizes the top surface of the color filter layer 112a and 112b to stabilize the following processes.

A gate electrode 114 of a conductive material such as metal is formed on the overcoat layer 113 and a gate insulating layer 115 covers the gate electrode 114. The gate electrode 114 is connected to a gate line (not shown). An active layer 116 of amorphous silicon is formed on the gate insulating layer 115 over the gate electrode 114. An ohmic contact layer 117a and 117b of impurity-doped amorphous silicon is formed on the active layer 116. Source and drain electrodes 118a and 118b facing into each other are formed on the ohmic contact layer 117a and 117b. The source and drain electrodes 118a and 118b form a TFT "T1" with the gate electrode 114. The source electrode 118a is connected to a data line (not shown) that crosses the gate line and defines a pixel region "P" with the gate line.

A passivation layer 119 is formed on the source and drain electrodes 118a and 118b. The passivation layer 119 has a contact hole 119c exposing a portion of the drain electrode 118b. A black matrix 120 of an opaque conductive material is formed on the passivation layer 119 over the TFT "T1". Further, a pixel electrode 121 of a transparent conductive material is formed on the passivation layer 119 at the pixel region and connected to the drain electrode 118b through the contact hole 119c.

A common electrode 132 of a transparent conductive material such as indium-tin-oxide (ITO) is formed on the inner surface of the second substrate 131.

A liquid crystal layer 140 is interposed between the pixel electrode 121 and the common electrode 132. An alignment layer (not shown) formed on each of the pixel electrode 121 and the common electrode 132 determines an initial alignment of the liquid crystal molecules.

FIGS. 3A to 3G are cross-sectional views showing a fabricating process of an array substrate for a liquid crystal display device according to the first embodiment of the present invention.

Figure 3A:
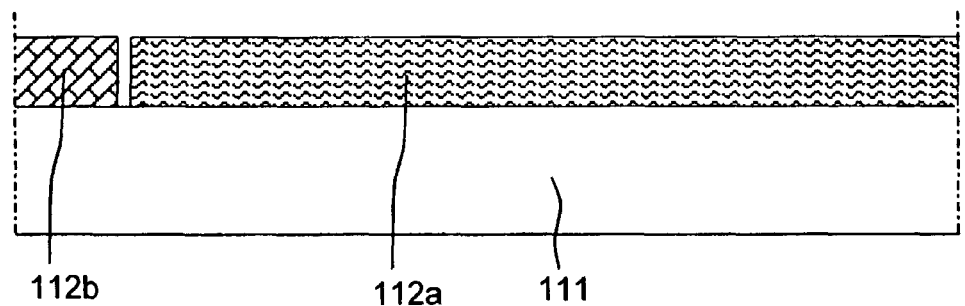
FIGS. 3A to 3G are cross-sectional views showing a fabricating process of an array substrate for a liquid crystal display device according to the first embodiment of the present invention.

In FIG. 3A, a color filter layer 112a and 112b is formed on a substrate 111. The color filter layer 112a and 112b may be fabricated through a dyeing method, a printing method, a pigment dispersion method, or an electro-deposition method. The pigment dispersion method is widely used due to its high elaborateness and good repeatability.

Figure 3B:
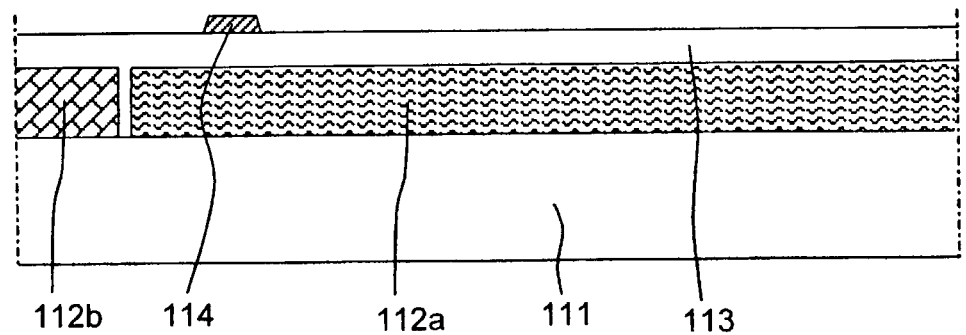

In FIG. 3B, an overcoat layer 113 is formed on the color filter layer 112a and 112b to eliminate the step generated by the color filter layer 112a and 112b. A gate electrode 114 of a conductive material such as metal is formed on the overcoat layer 113. Simultaneously, a gate line (not shown) connected to the gate electrode 114 and extended along a first direction is also formed on the overcoat layer 113.

Figure 3C:
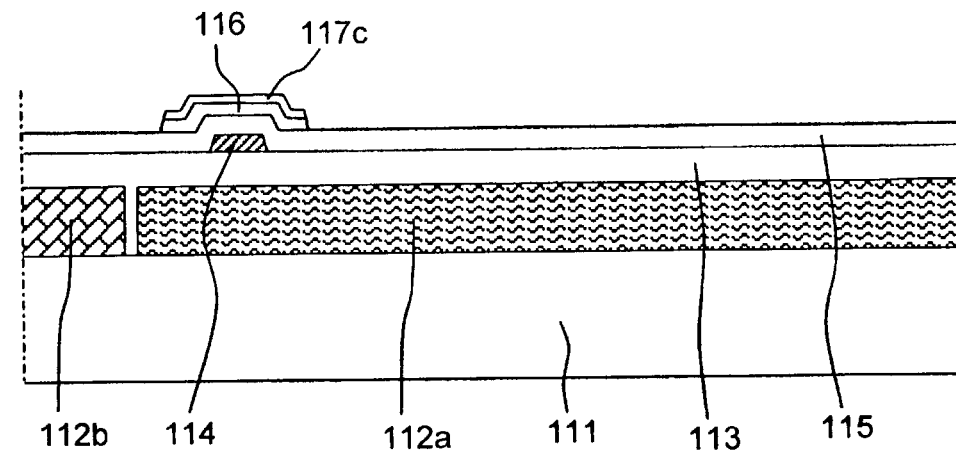

In FIG. 3C, after forming a gate insulating layer 115 on the overcoat layer 113 including the gate electrode 114, an active layer 116 and an impurity-doped semiconductor layer 117c are formed on the gate insulating layer 115 by sequentially depositing and patterning amorphous silicon and impurity-doped amorphous silicon.

Figure 3D:
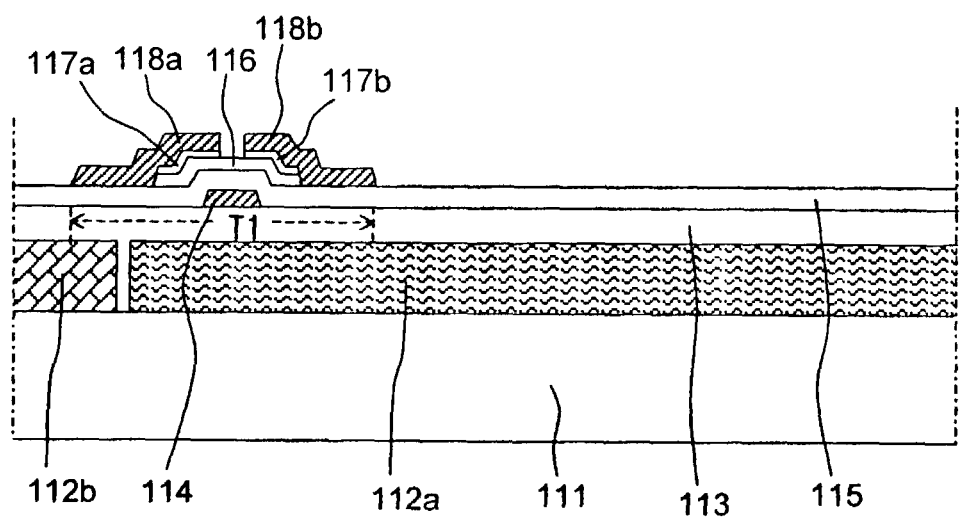

In FIG. 3D, source and drain electrodes 118a and 118b are formed on the impurity-doped semiconductor layer 117c (shown in FIG. 3C) through depositing and patterning a metallic material. Next, an ohmic contact layer 117a and 117b is completed through etching the impurity-doped amorphous silicon between the source and drain electrodes 118a and 118b. A data line (not shown) connected to the source electrode 118a and extended along a second direction is also formed. The data line crosses the gate line and defines a pixel region with the gate line. Here, the source and drain electrodes 118a and 118b form a TFT "T1" with the gate electrode 114.

Figure 3E:
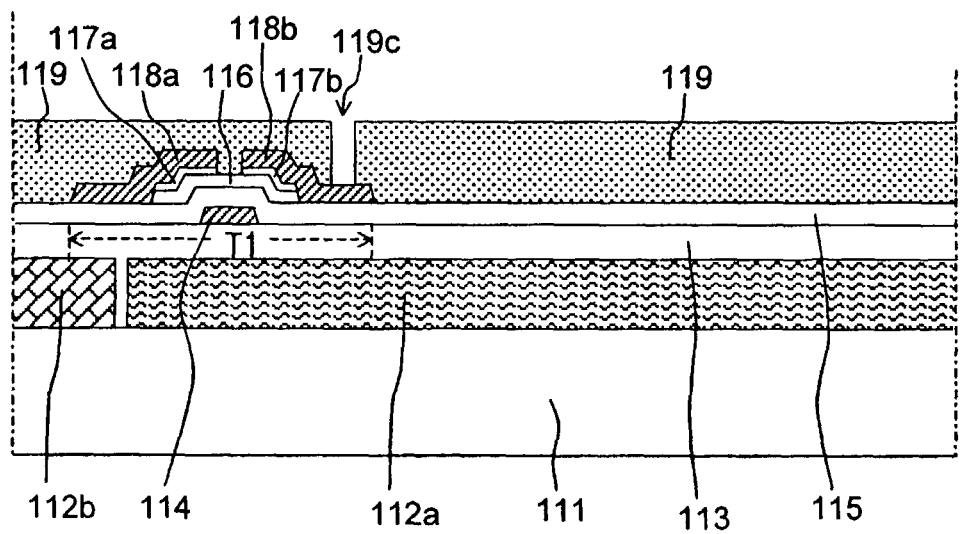

In FIG. 3E, a passivation layer 119 is formed on the source and drain electrodes 118a and 118b through depositing and patterning one of benzocyclobutene (BCB) and an acrylic organic material having a low permittivity. The passivation layer 119 has a contact hole 119c exposing the drain electrode 118b.

Figure 3F:
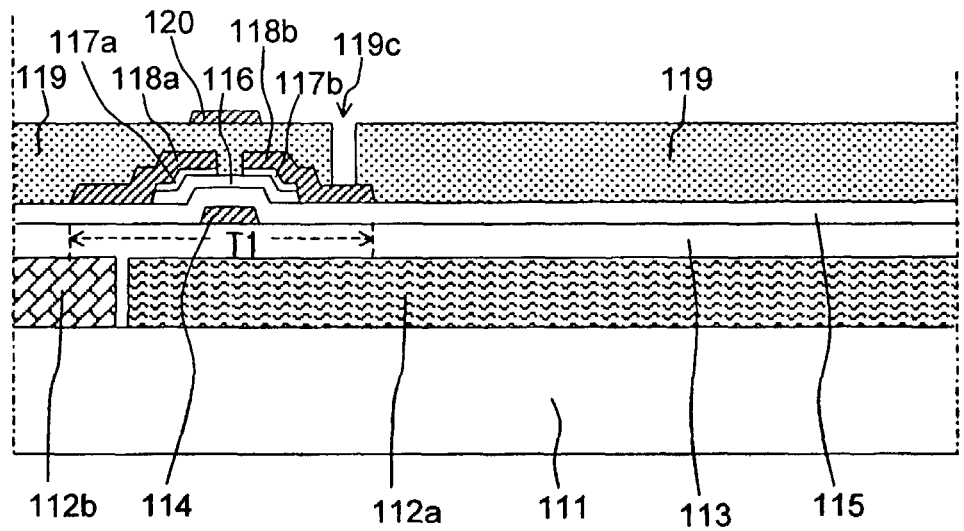

In FIG. 3F, a black matrix 120 is formed on the passivation layer 119 over the TFT "T1" through depositing and patterning a metallic material. The black matrix 120 may be formed of one of chromium (Cr), molybdenum (Mo), and titanium (Ti). Alternatively, the black matrix may have an organic material. However, a cost of the organic material is higher than that of the metallic material and a patterning characteristic of the organic material is worse than that of the metallic material. Moreover, since the black matrix of the organic material generates a big step, rubbing for an alignment layer becomes imperfect. This causes a disclination.

Figure 3G:
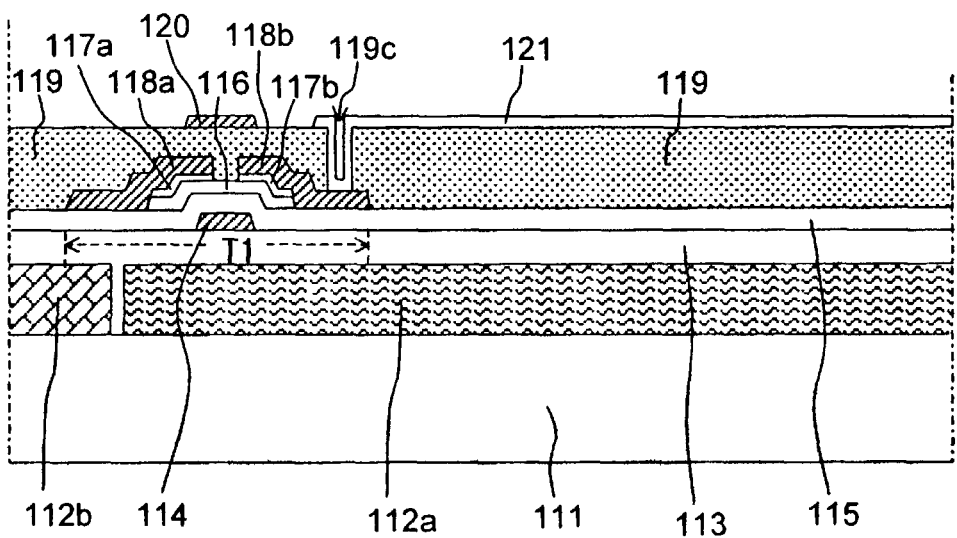

In FIG. 3G, a pixel electrode 121 is formed on the passivation layer 119 at the pixel region through depositing and patterning one of ITO, indium-zinc-oxide (IZO) and indium-tin-zinc-oxide (ITZO). The pixel electrode 121 corresponds to the color filter layer 112a and 112b and contacts the drain electrode 118b through the contact hole 119c.

After the fabricating process of an array substrate, the array substrate is attached to a color filter substrate having a common electrode thereon and a liquid crystal layer is injected to complete an LCD device of FIG. 2. In the first embodiment of the present invention, a black matrix of a metallic material is formed over a TFT of an array substrate so that a photocurrent of the TFT is prevented.

Figure 4:
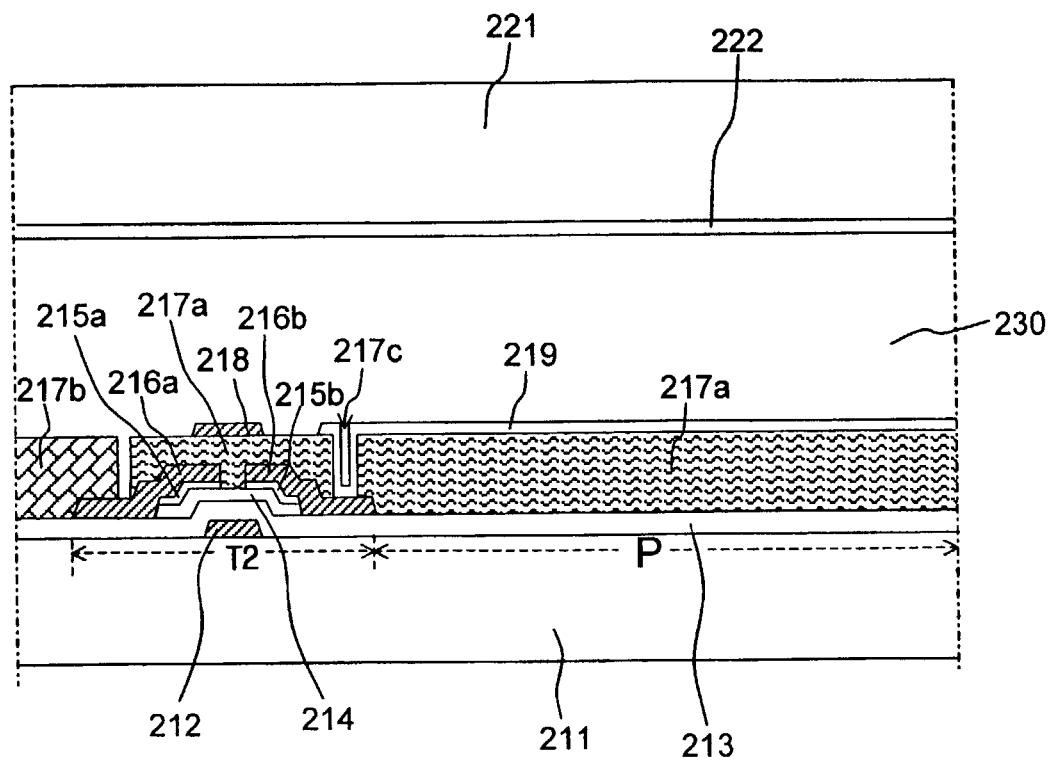
FIG. 4 is a schematic cross-sectional view of a liquid crystal display device according to a second embodiment of the present invention.

FIG. 4 is a schematic cross-sectional view of a liquid crystal display device according to a second embodiment of the present invention. The LCD device of FIG. 2 has a COT type structure in which a color filter layer is formed over a TFT.

In FIG. 4, a first substrate 211 and a second substrate 221 are facing into and spaced apart from each other. A gate electrode 212 of a conductive material such as metal is formed on the inner surface of the first substrate 211 and a gate insulating layer 213 covers the gate electrode 212. The gate electrode 212 is connected to a gate line (not shown). An active layer 214 of amorphous silicon is formed on the gate insulating layer 213 over the gate electrode 212. An ohmic contact layer 215a and 215b of impurity-doped amorphous silicon is formed on the active layer 214. Source and drain electrodes 216a and 216b forming a TFT "T2" with the gate electrode 212 are formed on the ohmic contact layer 215a and 215b. The source electrode 216a is connected to a data line (not shown) that crosses the gate line and defines a pixel region "P" with the gate line.

A color filter layer 217a and 217b is formed on the source and drain electrodes 216a and 216b. The color filter layer 217a and 217b having three colors of R, G, and B is alternately disposed and the color filter layer of one color corresponds to one pixel region. The color filter layer 217a on the drain electrode 216b has a contact hole 217c exposing the drain electrode 216b. As a development of the material for the color filter layer 217a and 217b, the color filter layer 217a and 217b does not damage underlying layers. Accordingly, a protecting layer under the color filter layer 217a and 217b is not necessary. A black matrix 218 of an opaque conductive material is formed on the color filter layer 217a over the TFT "T2". Further, a pixel electrode 219 of a transparent conductive material is formed on the color filter layer 217a at the pixel region and connected to the drain electrode 216b through the contact hole 217c.

A common electrode 222 of a transparent conductive material such as indium-tin-oxide (ITO) is formed on the inner surface of the second substrate 221.

A liquid crystal layer 230 is interposed between the pixel electrode 219 and the common electrode 222.

FIGS. 5A to 5G are cross-sectional views showing a fabricating process of an array substrate for a liquid crystal display device according to the second embodiment of the present invention.

Figure 5A:
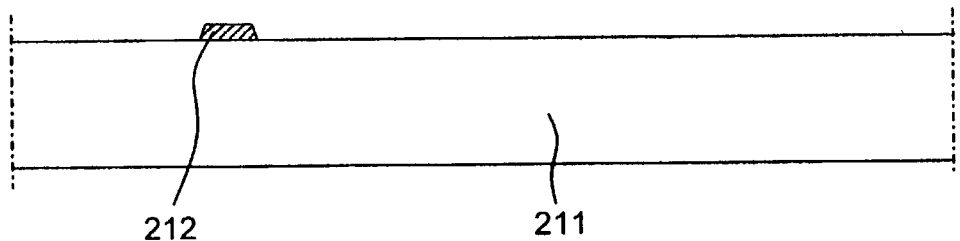
FIGS. 5A to 5F are cross-sectional views showing a fabricating process of an array substrate for a liquid crystal display device according to the second embodiment of the present invention.

In FIG. 5A, a gate electrode 212 of a conductive material such as metal is formed on a substrate 211. Simultaneously, a gate line (not shown) connected to the gate electrode 212 and extended along a first direction is also formed on the substrate 211.

Figure 5B:
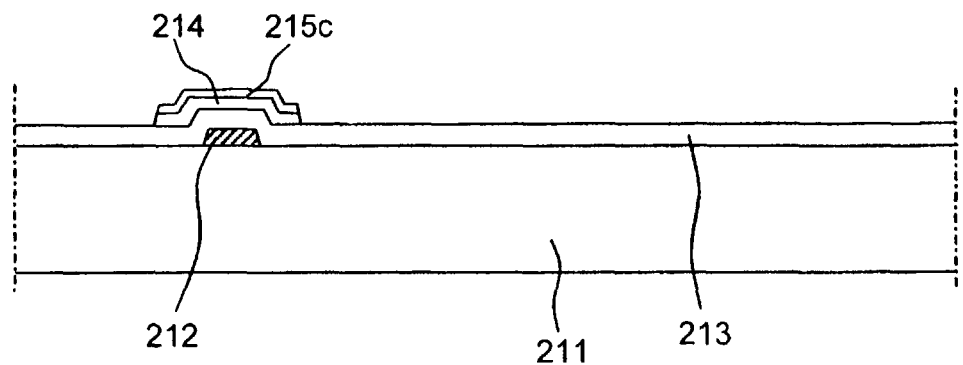

In FIG. 5B, a gate insulating layer 213 is formed on the gate electrode 212 including the substrate 211. After sequentially depositing amorphous silicon and impurity-doped amorphous silicon, an active layer 214 and an impurity-doped semiconductor layer 215c are formed on the gate insulating layer 213 through patterning.

Figure 5C:
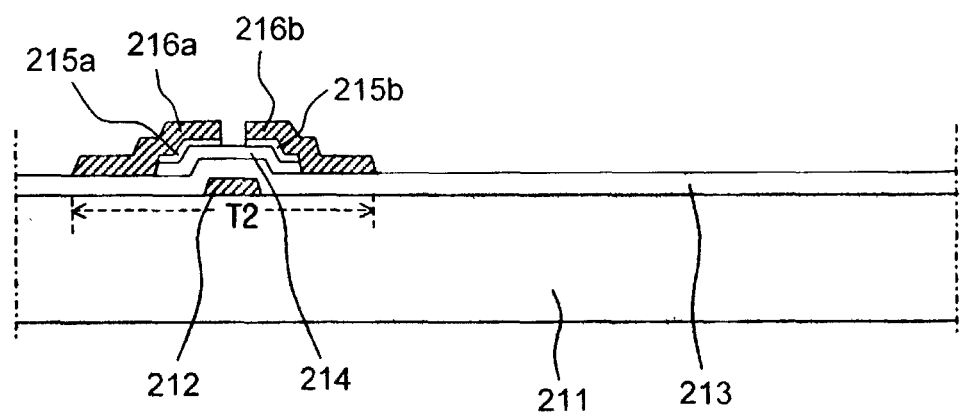

In FIG. 5C, source and drain electrodes 216a and 216b are formed on the impurity-doped semiconductor layer 215c (shown in FIG. 5B) through depositing and patterning a metallic material. Next, an ohmic contact layer 215a and 215b is completed through etching the impurity-doped amorphous silicon between the source and drain electrodes 216a and 216b. A data line (not shown) connected to the source electrode 216a and extended along a second direction is also formed. The data line crosses the gate line and defines a pixel region with the gate line. Here, the source and drain electrodes 216a and 216b compose a TFT "T2" with the gate electrode 212.

Figure 5D:
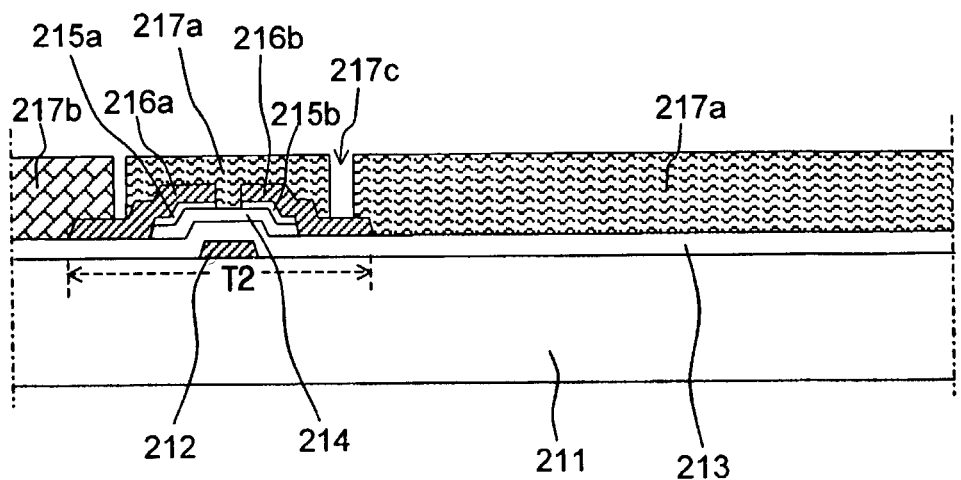

In FIG. 5D, a color filter layer 217a and 217b is formed on the source and drain electrodes 216a and 216b. The color filter layer 217a and 217b has a contact hole 217c exposing the drain electrode 216b. The color filter layer 217a and 217b may be fabricated through a dyeing method, a printing method, a pigment dispersion method, or an electro-deposition method.

Figure 5E:
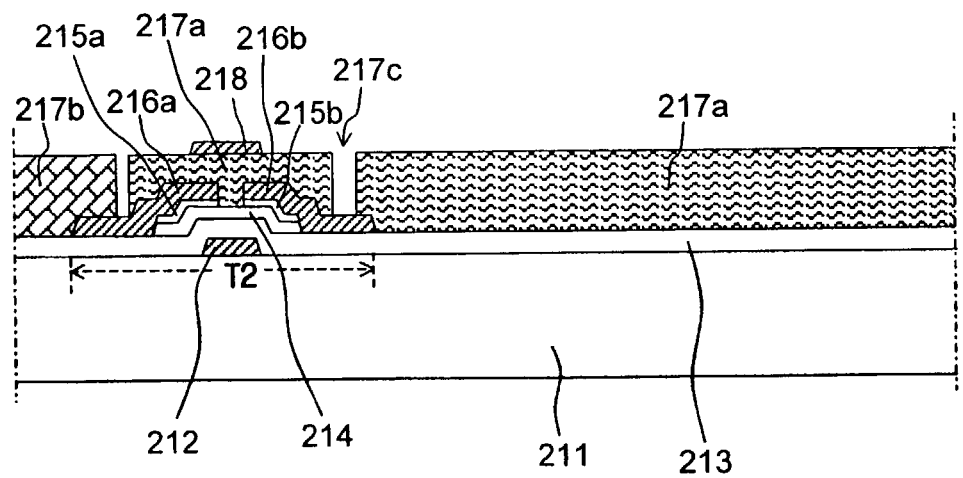

In FIG. 5E, a black matrix 218 is formed on the color filter layer 217a and 217b over the TFT "T2" through depositing and patterning a metallic material. The black matrix 218 may be formed of one of chromium (Cr), molybdenum (Mo), and titanium (Ti).

Figure 5F:
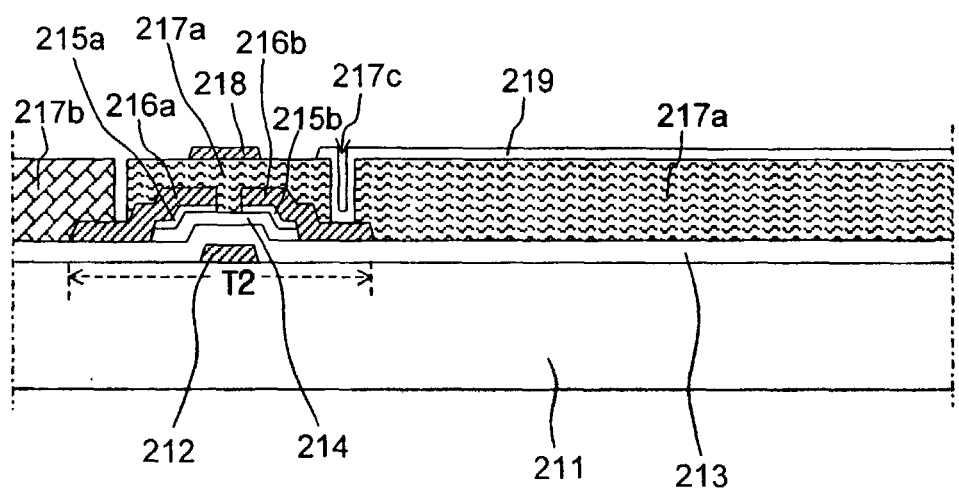

In FIG. 5F, a pixel electrode 219 is formed on the color filter layer 217a and 217b at the pixel region through depositing and patterning one of ITO, IZO, and ITZO. The pixel electrode 219 is connected to the drain electrode 216b through the contact hole 217c.

In the second embodiment of the present invention, a black matrix of the metallic material is formed over a TFT of an array substrate so that a photocurrent of the TFT is not generated. Moreover, a voltage may be applied to the black matrix through connecting the black matrix and the pixel electrode, thereby improving characteristics of the TFT.

Figure 6:
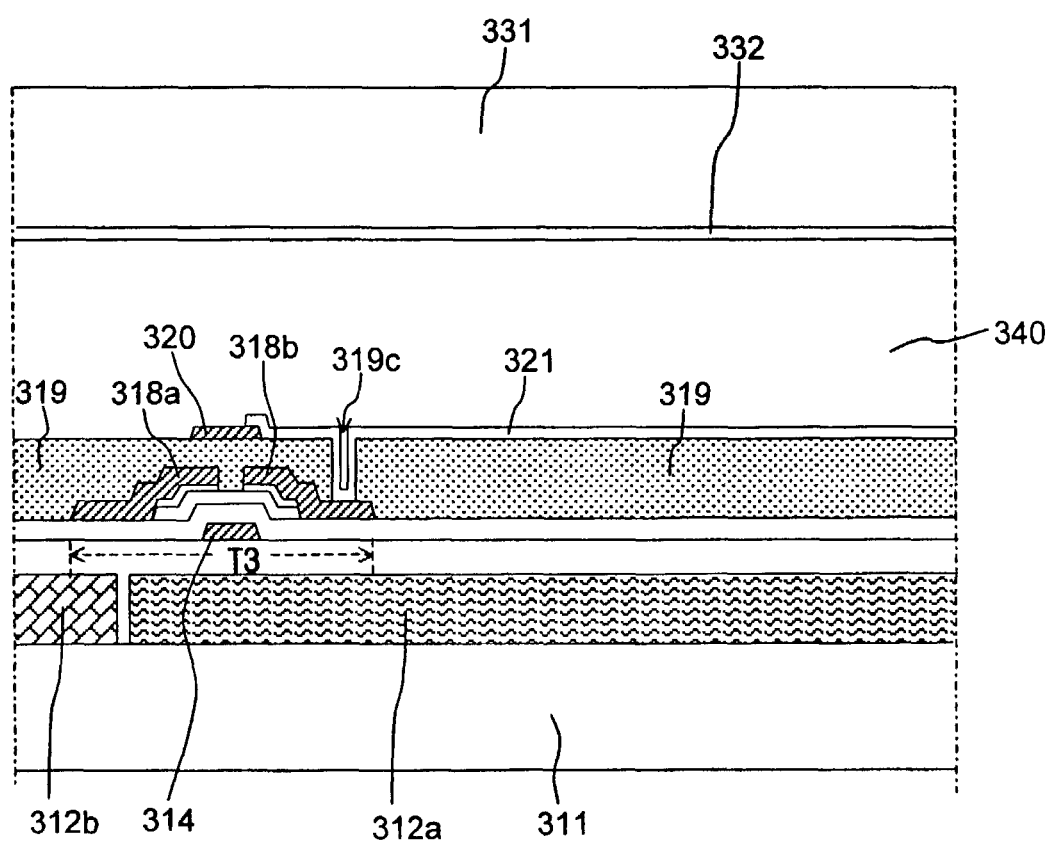
FIG. 6 is a schematic cross-sectional view of a liquid crystal display device according to a third embodiment of the present invention.

FIG. 6 is a schematic cross-sectional view of a liquid crystal display device according to a third embodiment of the present invention. Since the third embodiment is similar to the first embodiment, illustrations for the same part will be omitted.

In FIG. 6, first and second substrates 311 and 331 face into each other. A color filter layer 312a and 312b is formed on the inner surface of the first substrate 311 and a TFT "T3" including a gate electrode 314, source and drain electrodes 318a and 318b is formed over the color filter layer 312a and 312b. A passivation layer 319 having a contact hole 319c covers the TFT "T3". The contact hole 319c exposes the drain electrode 318b. A black matrix 320 of a metallic material such as Cr, Mo, and Ti is formed on the passivation layer 319 over the TFT "T3". A pixel electrode 321 is formed on the passivation layer 319 at a pixel region. The pixel electrode 321 is connected to the black matrix 320 and to the drain electrode 318b through the contact hole 319c. A common electrode 332 is formed on the inner surface of the second substrate 331. A liquid crystal layer 340 is interposed between the pixel electrode 321 and the common electrode 332.

Figure 7:
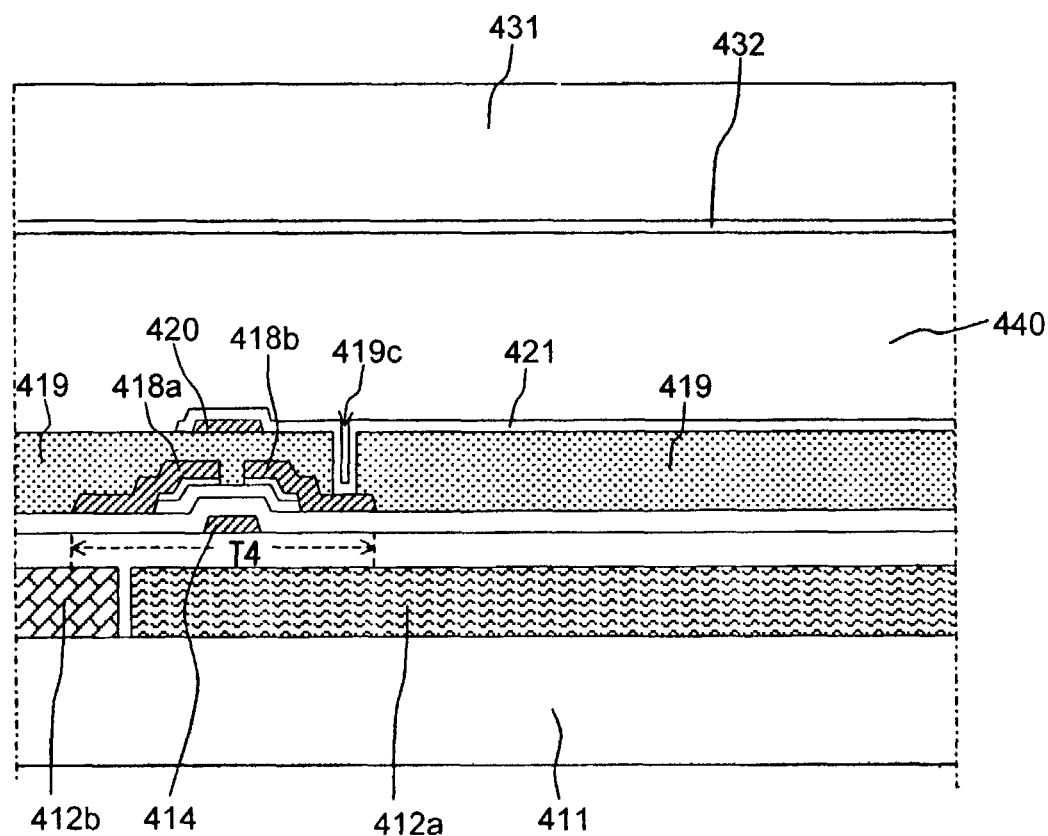
FIG. 7 is a schematic cross-sectional view of a liquid crystal display device according to a fourth embodiment of the present invention.

FIG. 7 is a schematic cross-sectional view of a liquid crystal display device according to a fourth embodiment of the present invention. Since the fourth embodiment is similar to the first embodiment, illustrations for the same part will be omitted.

In FIG. 7, first and second substrates 411 and 431 face into each other. A color filter layer 412a and 412b is formed on the inner surface of the first substrate 411 and a TFT "T4" including a gate electrode 414, source and drain electrodes 418a and 418b is formed over the color filter layer 412a and 412b. A passivation layer 419 having a contact hole 419c covers the TFT "T4". The contact hole 419c exposes the drain electrode 418b. A black matrix 420 of a metallic material such as Cr, Mo, and Ti is formed on the passivation layer 419 over the TFT "T4". A pixel electrode 421 is formed on the passivation layer 419 at a pixel region. The pixel electrode 421 connected to the drain electrode 418b through the contact hole 419c covers and contacts the black matrix 420. A common electrode 432 is formed on the inner surface of the second substrate 431. A liquid crystal layer 440 is interposed between the pixel electrode 421 and the common electrode 432.

In the third and fourth embodiments of the present invention, a voltage of the pixel electrode is applied to the black matrix through connecting the black matrix and the pixel electrode. Accordingly, the black matrix controls charges in a back channel of the TFT so that an effect of the dual gate TFT can be obtained. Moreover, the pixel electrode of the fourth embodiment protects the black matrix.

Figure 8:
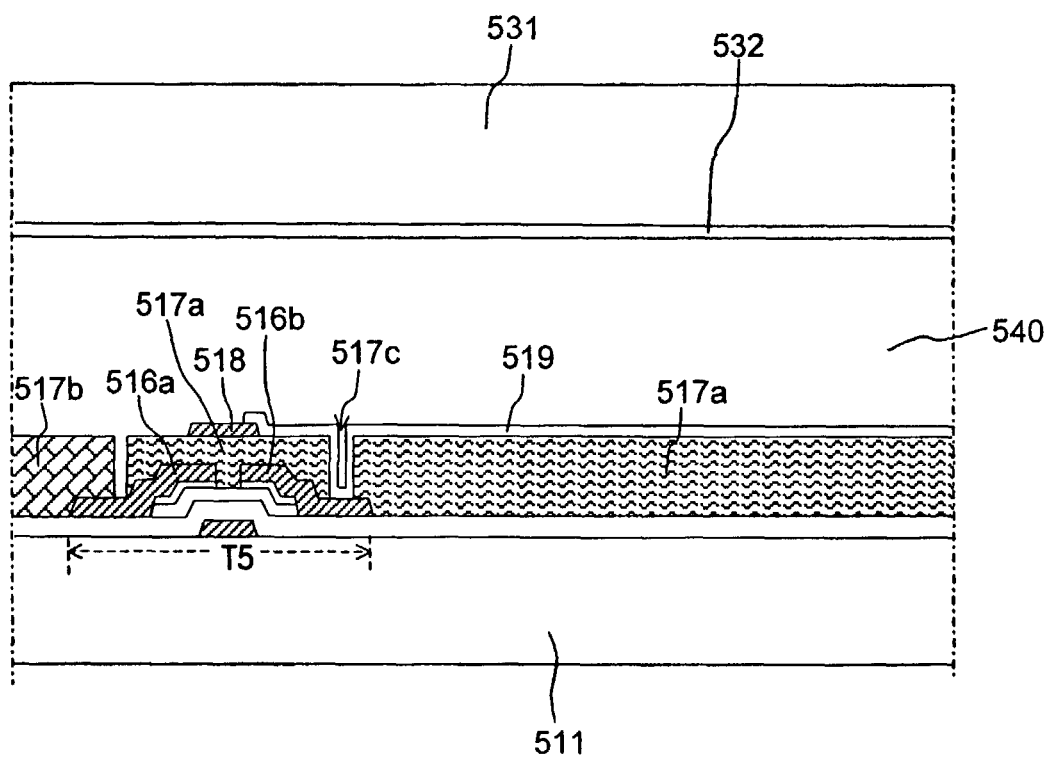
FIG. 8 is a schematic cross-sectional view of a liquid crystal display device according to a fifth embodiment of the present invention.

FIG. 8 is a schematic cross-sectional view of a liquid crystal display device according to a fifth embodiment of the present invention. Since the fifth embodiment is similar to the second embodiment, illustrations for the same part will be omitted.

In FIG. 8, first and second substrates 511 and 531 face into each other. A TFT "T5" is formed on the inner surface of the first substrate 511 and a color filter layer 517a and 517b is formed on the TFT "T5". The color filter layer 517a and 517b has a contact hole 517c exposing a drain electrode 516b of the TFT "T5". A black matrix 518 of a metallic material such as Cr, Mo, and Ti is formed on the color filter layer 517a and 517b over the TFT "T5". A pixel electrode 519 is formed on the color filter layer 517a and 517b at a pixel region. The pixel electrode 519 is connected to the black matrix 518 and to the drain electrode 516b through the contact hole 517c. A common electrode 532 is formed on the inner surface of the second substrate 531. A liquid crystal layer 540 is interposed between the pixel electrode 519 and the common electrode 532.

Figure 9:
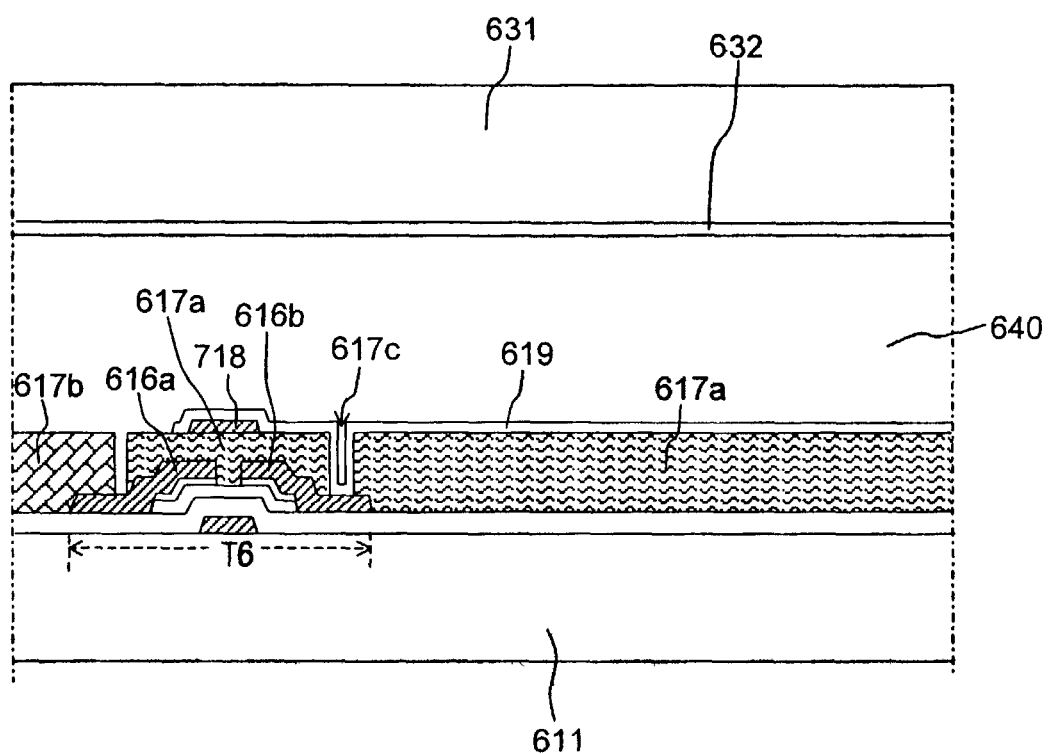
FIG. 9 is a schematic cross-sectional view of a liquid crystal display device according to a sixth embodiment of the present invention.

FIG. 9 is a schematic cross-sectional view of a liquid crystal display device according to a sixth embodiment of the present invention. Since the sixth embodiment is similar to the second embodiment, illustrations for the same part will be omitted.

In FIG. 9, first and second substrates 611 and 631 face into each other. A TFT "T6" is formed on the inner surface of the first substrate 611 and a color filter layer 617a and 617b is formed on the TFT "T6". The color filter layer 617a and 617b has a contact hole 617c exposing a drain electrode 616b of the TFT "T6". A black matrix 618 of a metallic material such as Cr, Mo, and Ti is formed on the color filter layer 617a and 617b over the TFT "T6". A pixel electrode 619 is formed on the color filter layer 617a and 617b at a pixel region. The pixel electrode 619 connected to the drain electrode 616b through the contact hole 617c covers and contacts the black matrix 618. A common electrode 632 is formed on the inner surface of the second substrate 631. A liquid crystal layer 640 is interposed between the pixel electrode 619 and the common electrode 632.

In the fifth and sixth embodiments of the present invention, characteristics of the TFT are improved and the black matrix is protected.

Consequently, since a color filter layer is formed on an array substrate and a black matrix is formed over a TFT on an array substrate, an aperture ratio increases and a photocurrent of the TFT is prevented. Here, a patterning characteristic is improved and an imperfect rubbing problem is solved due to a black matrix of a conductive material. Moreover, a TFT characteristic is improved through connecting the black matrix and the pixel electrode.

It will be apparent to those skilled in the art that various modifications and variations can be made in the liquid crystal display device and the fabricating method thereof of the present invention without departing from the spirit or scope of the inventions. Thus, it is intended that the present invention covers the modifications and variations of this invention provided they come within the scope of the appended claims and their equivalents.

What is claimed is:
1. A liquid crystal display device, comprising:
   first and second substrates facing into each other;
   a gate line and a data line on an inner surface of the first substrate, the gate line and the data line defining a pixel region;
   a thin film transistor connected to the gate line and the data line;
   a passivation layer of an organic material directly on the film transistor, wherein the passivation layer has a contact hole exposing the thin film transistor;

a pixel electrode connected to the thin film transistor through the contact hole and disposed at the pixel region, wherein the pixel electrode is formed directly on the passivation layer;

a color filter layer disposed closer than the pixel electrode from the first substrate, the color filter layer corresponding to the pixel electrode and the pixel region, wherein two adjacent color filter layers in two adjacent pixel regions are spaced apart from each other to define a gap with the first substrate;

an overcoat layer on the color filter layer that protects and planarizes the color filter layer, wherein the gap is filled with the overcoat layer such that a step generated by the gap is eliminated, and wherein a top surface of the overcoat layer is flat without a through hole;

a black matrix over the thin film transistor, wherein the black matrix includes a conductive metallic material, wherein the black matrix is formed directly on the passivation layer;

a common electrode on an inner surface of the second substrate; and a liquid crystal layer interposed between the pixel electrode and the common electrode, wherein the pixel electrode covers the entire black matrix to sandwich the black matrix between the pixel electrode and the thin film transistor and is electrically connected to the entire black matrix and wherein the color filter layer is formed under the thin film transistor.

2. The device according to claim 1, wherein the color filter layer has three colors of red, green, and blue.

3. The device according to claim 1, wherein the black matrix is formed of one of chromium, molybdenum, and titanium.

4. The device according to claim 1, wherein the pixel electrode directly contacts the black matrix.

5. The device according to claim 1, wherein the color filter layer overlaps with the thin film transistor.

6. The device according to claim 1, wherein the color filter layer is directly below the thin film transistor.

7. The device according to claim 1, wherein the black matrix is between the passivation layer and the second substrate.

8. A liquid crystal display device, comprising:
first and second substrates facing each other;
a color filter layer on the first substrate;
an overcoat layer on the color filter layer;
a thin film transistor on the overcoat layer;
a passivation layer directly on the thin film transistor, the passivation layer having a contact hole exposing the thin film transistor;
a black matrix directly on the passivation layer and over the thin film transistor;
a pixel electrode directly on the passivation layer and connected to the thin film transistor through the contact hole;
a common electrode on the second substrate; and
a liquid crystal layer interposed between the pixel electrode and the common electrode, wherein the thin film transistor and is between the color filter layer and the black matrix.

9. The device according to claim 8, wherein the thin film transistor is over the color filter layer.

10. The device according to claim 8, wherein the black matrix is between the passivation layer and the second substrate.

* * * * *